May 8, 1928.  
H. WEISS-OESCHGER  
1,668,994  
FABRIC EXPANDING ROLLER  
Filed Jan. 29, 1926
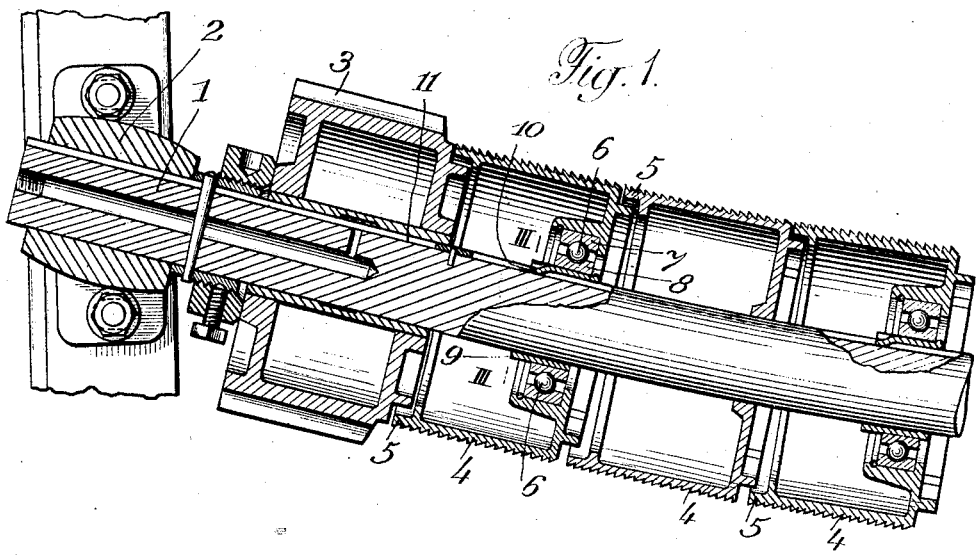
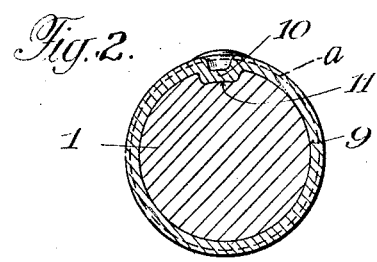
Inventor:  
Hans Weiss-Oeschger  
By Henry Orth  
atty.

Patented May 8, 1928.

1,668,994

UNITED STATES PATENT OFFICE.

HANS WEISS-OESCHGER, OF UZWIL, SWITZERLAND, ASSIGNOR TO MASCHINEN-FABRIK BENNINGER A. G., OF UZWIL, SWITZERLAND.

FABRIC-EXPANDING ROLLER.

Application filed January 29, 1926, Serial No. 84,691, and in Switzerland February 3, 1925.

Devices for stretching fabric widthwise are known which are provided with roll elements some or all of which are rotatably mounted by means of anti-friction bearings on a curved or arc-shaped shaft. It has been experienced in practice that the anti-friction bearings mounted in the roll elements are sometimes after a short running completely blocked up by foreign matter such as slurry and fibres, whereupon the inner race rings of the bearings are caused to take part in the rotation of the roll elements and to bite in the shaft and damage the latter. In order to overcome this disadvantage with the subject matter according to the present invention the inner race rings of the anti-friction bearings are displaceable in the axial direction but are secured against a turning motion relatively to the shaft.

A constructional example of the subject matter of the present invention is illustrated on the accompanying drawings, in which:

Fig. 1 shows a portion of the expanding roller in a vertical section and

Fig. 2 is a section along line III—III in Fig. 1 on a larger scale.

In the drawings 1 denotes the known curved shaft which is non-rotatably held at both ends in oblique bearings 2. In each end part of the shaft 1 a gear wheel 3 is rotatably mounted serving to drive the roll elements 4. The latter as well as the gear wheels 3 are provided with lateral dogs 5 and recesses with which adjacent elements interengage whereby the rotation of the gear wheel 3 is transmitted to the fabric expanding elements. The anti-friction bearing arranged inside a roll element 4 is shown to be a ball bearing 6; the outer race ring 7 is rigidly fixed in the element 4 whilst the inner race ring 8 is rigidly mounted on a conical sleeve 9 the taper $a$ of which is small and is indicated by the dotted line in Figure 2 provided with an inwardly bent part 10. The latter projects from above into a longitudinal groove 11 of the shaft, so that the sleeve 9 is secured against a turning movement relatively to the shaft but may be displaced in the axial direction on the shaft 1. The inner race ring 8 is thereby also secured against rotation and on the balls 6 the outer race ring 7 together with the roll element 4 rotates. Obviously in order to obtain the same effect a projecting part of the shaft 1 may engage with a longitudinal recess of the sleeve 9 or of the inner race ring 8.

All the roll elements 4 may be provided with antifriction bearings or only the alternate roll elements may be supported on the shaft by anti-friction bearings and the intermediate roll elements may be floatingly held as is shown in Fig. 2.

The outer circumference of the roll elements may be smooth or it may show any serration or undulation. Instead of ball bearings roller bearings may be provided.

I claim:

1. In a device for stretching fabrics widthwise, in combination, a curved shaft, a plurality of roll elements, antifriction bearings provided in at least some of said roll elements for rotatably mounting the latter on said shaft and having inner race rings, and conical sleeves on said shaft, said sleeves being slidably arranged in the axial direction but secured against rotation relatively to said shaft, said inner roll rings being in rigid connection with said sleeves.

2. In a device for stretching fabrics widthwise, in combination, a curved shaft, a plurality of roll elements on said shaft, dogs and recesses provided on the lateral faces of said roll elements for coupling and interconnecting the latter, anti-friction bearings provided in every alternate roll element for rotatably mounting the latter on said shaft and having inner race rings, the intermediate roll elements being floatingly held by the interengagement with the other roll elements, and conical sleeves on said shaft, said sleeves being slidably arranged in the axial direction but secured against rotation relatively to said shaft, said inner race rings being in rigid connection with said sleeves.

In testimony whereof, I have signed my name to this specification.

HANS WEISS-OESCHGER.